H. D. EDMONDS.
CONTOUR SCALE.
APPLICATION FILED MAY 6, 1914.

1,129,081.

Patented Feb. 23, 1915.

WITNESSES
E. C. Steinkle
A. H. Opsahl

INVENTOR
H. D. Edmonds
BY HIS ATTORNEYS
Williamson Merchant

UNITED STATES PATENT OFFICE.

HERBERT D. EDMONDS, OF CULBERTSON, MONTANA.

CONTOUR-SCALE.

1,129,081.     Specification of Letters Patent.     Patented Feb. 23, 1915.

Application filed May 6, 1914. Serial No. 836,607.

*To all whom it may concern:*

Be it known that I, HERBERT D. EDMONDS, a citizen of the United States, residing at Culbertson, in the county of Sheridan and State of Montana, have invented certain new and useful Improvements in Contour-Scales; and I do hereby declare the following to be a full, clear, and exact description of the invention, such as will enable others skilled in the art to which it appertains to make and use the same.

My invention has for its object to provide a contour scale for determining both the lineal dimensions and contour lines of various shaped bodies; and, to this end, consists of the novel devices and combinations of devices hereinafter described and defined in the claims.

In the accompanying drawings, which illustrate the invention, like characters indicate like parts throughout the several views.

Figure 1:
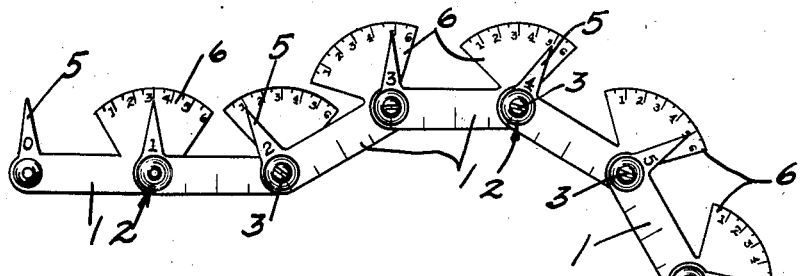
Figure 2:
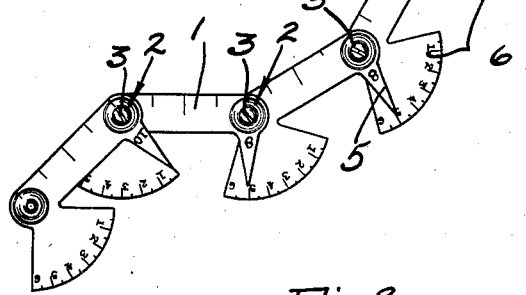
Figure 3:
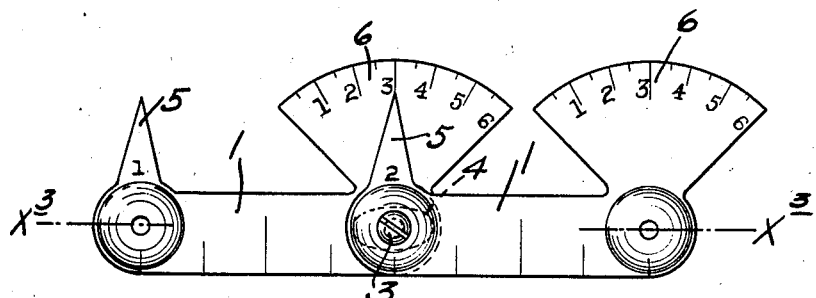
Figure 3:
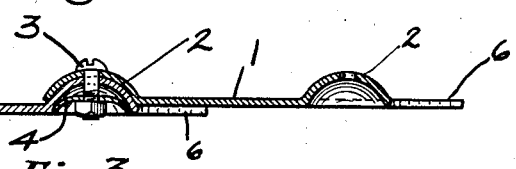

Referring to the drawings, Figure 1 is a plan view of the contour scale; Fig. 2 is a plan view, in detail, of two of the connected sections of said scale; and Fig. 3 is a longitudinal section, taken on the line $x^3$ $x^3$ of Fig. 2.

The improved contour scale is made up of a multiplicity of duplicate pivotally connected sections 1, having at each joint thereof an angle-indicator. Each pivot joint 2, between the scale sections 1, is formed by pressing or stamping the bodies of said sections laterally outward into concavo-convex form, fitting the one upon the other, and securing the same together by a screw-bolt 3. This form of joint securely holds the scale sections 1 against any tendency to separate, either edgewise or endwise.

To hold the scale sections 1 in frictional engagement, one with the other, so that they may be set and held at different angles with respect to each other, a spring plate 4 is intermediately mounted on each bolt 3, within the cavity of the respective joints, with only its ends engaging the side walls of said cavity. Obviously, by adjusting the nuts on the bolts 3, the plates 4 may be placed under more or less tension, to frictionally clamp the interlocked members of each joint, one upon the other.

On one end of each scale section 1 is a pointer 5, and on the other end thereof is a graduated segmental dial 6, with which the pointer 5 of the connected scale section coöperates, to afford the indicator, above referred to. These indicators are to give the angle between the respective scale sections, and the graduations on the dials 6 may be indicated by any suitable characters. The scale sections 1 are graduated, to indicate lineal measure, and on each thereof is marked or stamped an identifying character. As shown in Fig. 1, each scale section 1 represents one inch, and they are consecutively numbered, on the pointers 5, from 0 to 10, inclusive. It is, of course, understood that any number of scale sections 1 may be employed, depending on the length of the scale required.

In the use of the improved contour scale, the base or lower longitudinal edge thereof is placed on the object to be measured and pressed into close engagement therewith, by bending the same at its joints. The readings, as to the lineal measurements, and the angles at the connected sections 1, as given on the respective indicators, are marked down and preserved for future reference. Obviously, after a record is once made of these readings a pattern having the same contour lines may be made by again resetting the same scale or a similar scale. For instance, the record may be mailed or sent to a party at a distant point where the pattern is to be made.

Of the many uses to which a scale of this character may be put, it is only necessary to mention one, to-wit: tailoring, wherein the same may be used supplemental to the customary tape line and other instruments for taking measurements. By the use of this contour scale a large amount of detail description as to peculiarities of a person's form or build may be dispensed with, which is very essential in order to attempt to convey to the person making the clothes the proper impression of the person for whom the clothes are to be made. Such descriptions are often misleading owing to the differences in opinions as to the standard.

What I claim is:

1. A contour scale comprising a plurality of sections pivotally connected for movement on either side of a straight line passing through the pivots of next adjacent sections and angle indicators at the joints of said sections for setting adjacent sections of said scale at an angle to each other, said angle indicators arranged to permit one of the longitudinal edges of said scale to be placed directly on an object for the purpose of securing the contour thereof.

2. A contour scale comprising a plurality of pivotally connected sections and angle indicators at the joints thereof, each of said sections having an identifying character, whereby a contour line may be reproduced by resetting said scale from previously made notes, said angle indicators arranged to permit one of the longitudinal edges of said scale to be placed directly on an object, for the purpose of securing the contour thereof.

3. A contour scale comprising a plurality of sections pivotally connected for movement on either side of a straight line passing through the pivots of next adjacent sections and angle indicators at the joints of said sections for setting adjacent sections of said scale at an angle to each other, each of said sections having an identifying character whereby a contour line may be reproduced by resetting said scale from previously made notes, said angle indicators arranged to permit one of the longitudinal edges of said scale to be placed directly on an object, for the purpose of securing the contour thereof.

4. A contour scale comprising a plurality of pivotally connected frictionally held sections, graduated to indicate lineal measure, each of said sections having an identifying character and also having, at one end, a pointer, and, at its other end, a graduated dial with which the pointer of an adjacent section coöperates to afford an indicator.

5. A contour scale comprising a plurality of pivotally connected sections, graduated to indicate lineal measure, each of said sections having an identifying character and also having, at one end, a pointer, and, at its other end, a graduated dial with which the pointer of an adjacent section coöperates to afford an indicator, and means for placing the joints of said sections under a varying friction.

In testimony whereof I affix my signature in presence of two witnesses.

HERBERT D. EDMONDS.

Witnesses:
S. S. MORNS,
G. H. COULTER.